United States Patent
Wahl

(10) Patent No.: US 7,533,584 B1
(45) Date of Patent: May 19, 2009

(54) SYSTEMS AND METHODS FOR TEMPERATURE COMPENSATING TORQUE SENSORS

(75) Inventor: Robert Wahl, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/938,475

(22) Filed: Nov. 12, 2007

(51) Int. Cl.
*G01L 3/00* (2006.01)

(52) U.S. Cl. .................................. 73/862.331; 324/224

(58) Field of Classification Search ............... 73/862.08, 73/862.191, 862.321, 862.325, 862.331; 324/224, 431
See application file for complete search history.

(56) References Cited

U.S. PATENT DOCUMENTS

| | | | |
|---|---|---|---|
| 3,465,581 A | | 9/1969 | Hohenberg |
| 3,583,208 A | | 6/1971 | Byrne, Jr. |
| 3,921,300 A | | 11/1975 | Cox et al. |
| 4,956,606 A | | 9/1990 | Kwiatkowski et al. |
| 4,989,460 A | * | 2/1991 | Mizuno et al. ......... 73/862.335 |
| 5,087,866 A | | 2/1992 | Smith |
| 5,182,953 A | | 2/1993 | Ellinger et al. |
| 5,307,690 A | | 5/1994 | Hanazawa |
| 5,419,207 A | | 5/1995 | Kobayashi et al. |
| 5,522,269 A | | 6/1996 | Takeda et al. |
| 5,585,571 A | * | 12/1996 | Lonsdale et al. ....... 73/862.325 |
| 5,777,468 A | | 7/1998 | Maher |
| 6,370,967 B1 | * | 4/2002 | Kouketsu et al. ....... 73/862.333 |
| 6,381,526 B1 | | 4/2002 | Higashi et al. |
| 6,412,356 B1 | * | 7/2002 | Kouketsu et al. ....... 73/862.333 |
| 6,581,478 B2 | * | 6/2003 | Pahl et al. .............. 73/862.326 |
| 6,591,699 B2 | | 7/2003 | Ueno |
| 6,642,710 B2 | | 11/2003 | Morrison et al. |
| 7,126,355 B2 | | 10/2006 | Seto |
| 7,261,005 B2 | * | 8/2007 | Bunyer et al. .......... 73/862.333 |
| 7,389,702 B2 | * | 6/2008 | Ouyang et al. ......... 73/862.331 |
| 7,409,878 B2 | * | 8/2008 | Von Beck et al. ...... 73/862.333 |
| 2006/0225521 A1 | * | 10/2006 | Von Beck et al. ...... 73/862.331 |

* cited by examiner

*Primary Examiner*—Harshad Patel
*Assistant Examiner*—Freddie Kirkland, III
(74) *Attorney, Agent, or Firm*—Ingrassia Fisher & Lorenz, P.C.

(57) ABSTRACT

Apparatus, systems, and methods are provided for temperature compensating a torque sensor. One apparatus includes a shaft temperature detector and a temperature compensation circuit configured to alter tensile and compression voltages representative of tensile and compression stress, respectively, due to a torque being applied to the shaft based on shaft temperature. A system includes a sensor configured to generate tensile and compression voltages representative of tensile and compression stress, respectively, due to a torque being applied to a shaft, a shaft temperature detector, and a junction box. The junction box is configured to alter the tensile and compression voltages based on shaft temperature. One method includes receiving tensile and compression voltages representative of tensile and compression stress, respectively, due to torque being applied to a shaft, altering the tensile and compression voltages based on shaft temperature, and determining the amount of torque based on the altered tensile and compression voltages.

16 Claims, 3 Drawing Sheets

SYSTEMS AND METHODS FOR TEMPERATURE COMPENSATING TORQUE SENSORS

FIELD OF THE INVENTION

The present invention generally relates to sensors, and more particularly relates to systems and methods for temperature compensating a torque sensor.

BACKGROUND OF THE INVENTION

The amount of weight a helicopter is capable of carrying is dependent on the amount torque the helicopter engine (or engines) is able to apply to the rotor shaft. The amount of torque a helicopter engine is able to apply to the rotor shaft at any particular time is known to change based on factors such as, for example, weather (e.g., temperature, wind, atmospheric pressure, humidity, precipitation, etc.), location, altitude, and/or other similar environmental conditions. As such, helicopters often include a torque sensor for detecting the amount of torque the engine(s) is/are presently are applying to the rotor shaft so that the amount of weight the helicopter is capable of carrying may be properly determined.

One type of torque sensor (e.g., a magnetostrictive torque sensor) generates a tensile voltage ($V_t$) and a compression voltage ($V_c$). The tensile voltage $V_t$ represents stress in the tensile direction due to the torsional strain on the rotor shaft, and the compression voltage $V_c$ represents stress in the compression direction due to the torsional strain on the rotor shaft. The amount of torque applied to the rotor shaft may then be inferred from these voltages in accordance with the following conditioning equation: $(V_t - V_c)/(V_t + V_c)$.

In some helicopters, torque sensors may be located on or near the helicopter engine. As such, the accuracy of the torque sensor may be adversely affected by the amount of heat the engine generates. This is because, at least in part, some torque sensors, such as magnetostrictive torque sensors, are constructed with magnetically permeable material. As is known, the magnetic permeability of some materials is temperature dependant and so, therefore, may be the sum $V_t + V_c$. Specifically, as the permeability of the sensor material increases with temperature, $V_t$ and $V_c$ may also increase. An increase in both $V_t$ and $V_c$ increases the magnitude of the denominator in the conditioning equation (rather than remaining constant), which results in a decrease in the amount of indicated torque as temperature rises. Since the variations in torque sensor temperature from engine to engine are not controlled, variations in indicated torque may result.

Accordingly, it may be desirable to provide systems and methods for compensating a torque sensor based on the temperature of the rotor shaft. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various exemplary embodiments provide an apparatus for temperature compensating a torque sensor configured to output a tensile voltage and a compression voltage representative of a tensile stress and a compression stress, respectively, due to a torque applied to a shaft. One apparatus comprises a temperature detector in thermal communication with the shaft and a temperature compensation circuit coupled to the temperature detector and configured to be coupled to the sensor. The temperature compensation circuit also configured to receive a signal from the temperature detector representing a shaft temperature and to alter the tensile voltage and the compression voltage based on the shaft temperature.

Systems for measuring an amount of torque being applied to a shaft are also provided. One system comprises a torque sensor coupled to the shaft and a temperature detector in thermal communication with the shaft. The sensor is configured to generate a tensile voltage and a compression voltage representative of a tensile stress and a compression stress, respectively, due to a torque applied to the shaft, and the temperature detector is configured to detect the shaft temperature. The system also comprises a junction box coupled to the sensor and the temperature detector, wherein the junction box is configured to alter the tensile and compression voltages based on the shaft temperature.

Methods are also provided for temperature compensating a sensor configured to output a tensile voltage and a compression voltage representative of a tensile stress and a compression stress, respectively, due to a torque being applied to a shaft. One method comprises the steps of receiving the tensile and compression voltages and altering the tensile and compression voltages based on the temperature of the shaft. The method also comprises the step of determining the amount of torque being applied to the shaft based on the altered tensile and compression voltages.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
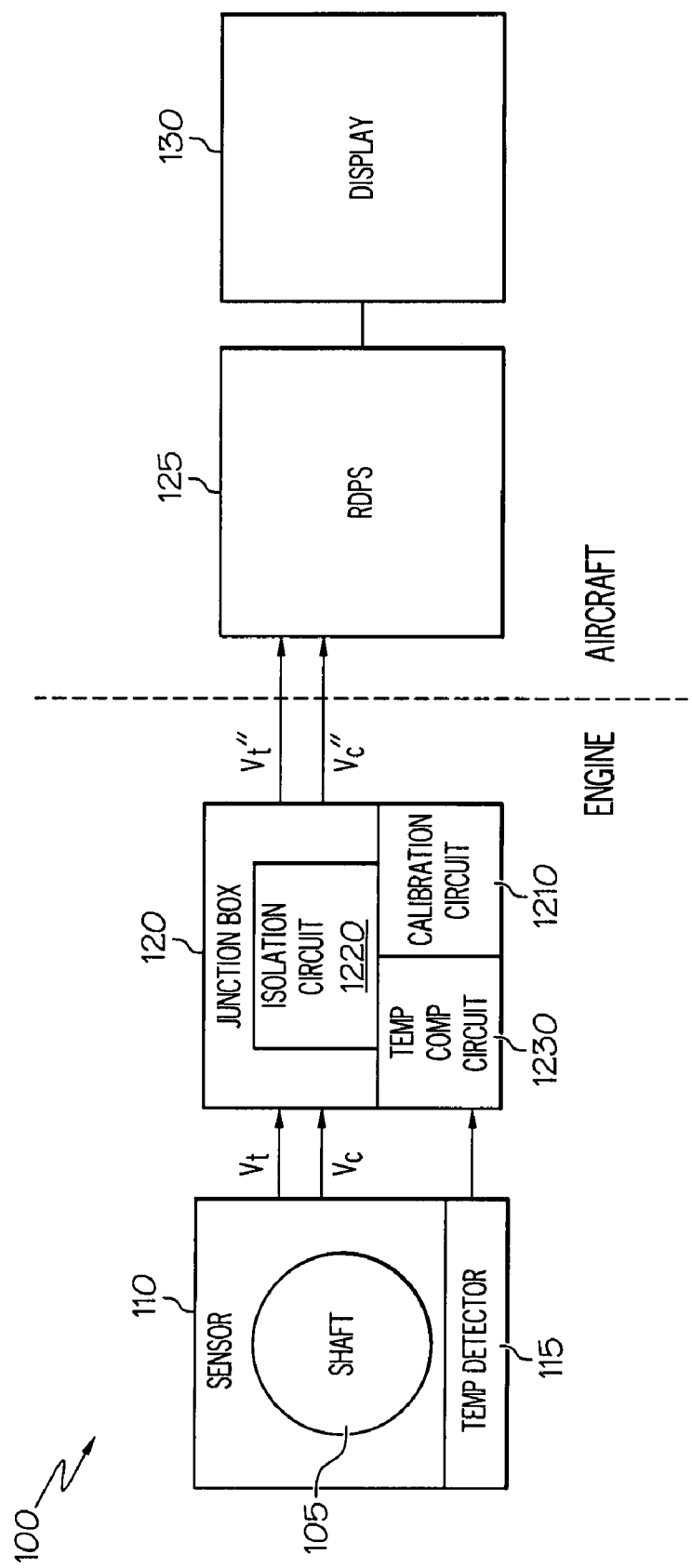
FIG. 1 is a block diagram of one exemplary embodiment of a system for determining the amount of torque is being applied to a shaft by an engine.

FIG. 1 is a block diagram of a system 100 for measuring an amount of torque being applied to a shaft 105 by an engine (not shown). In one embodiment, shaft 105 is coupled to a helicopter engine, and torque applied to shaft 105 is utilized to generate lift by rotating the rotors of the helicopter. Other embodiments of system 100 contemplate that shaft 105 may be utilized in other engine-driven applications (e.g., electric motors, motor vehicle engines, etc.) where it may be desirable to know the amount of torque an engine is applying to a shaft.

As illustrated in FIG. 1, system 100 includes a torque sensor 110 and a temperature detector 115 in thermal communication with shaft 105. System 100 also includes a junction box 120 coupled to torque sensor 110 and temperature detector 115, a ratiometric detector/power supply (RDPS) 125 coupled to junction box 120, and a display 130 coupled to RDPS 125.

Torque sensor 110 may be any hardware, circuitry, and/or device capable of determining the amount of torque an engine is applying to shaft 105. In one embodiment, torque sensor 110 is configured to generate an AC tensile voltage ($V_t$) representative of the amount of torsional strain in shaft 105 in the tensile direction and to generate an AC compression voltage ($V_c$) representative of the amount of torsional strain in shaft 105 in the compression direction.

Temperature detector 115 may be any hardware, circuitry, and/or device capable of resistively determining the temperature of shaft 105. In one embodiment, temperature detector 115 comprises a resistive temperature detector or RTD formed of, for example, platinum, nickel, or other similar material capable of determining the temperature of shaft 105. In another embodiment, temperature detector 115 comprises a thermistor.

Figure 2:
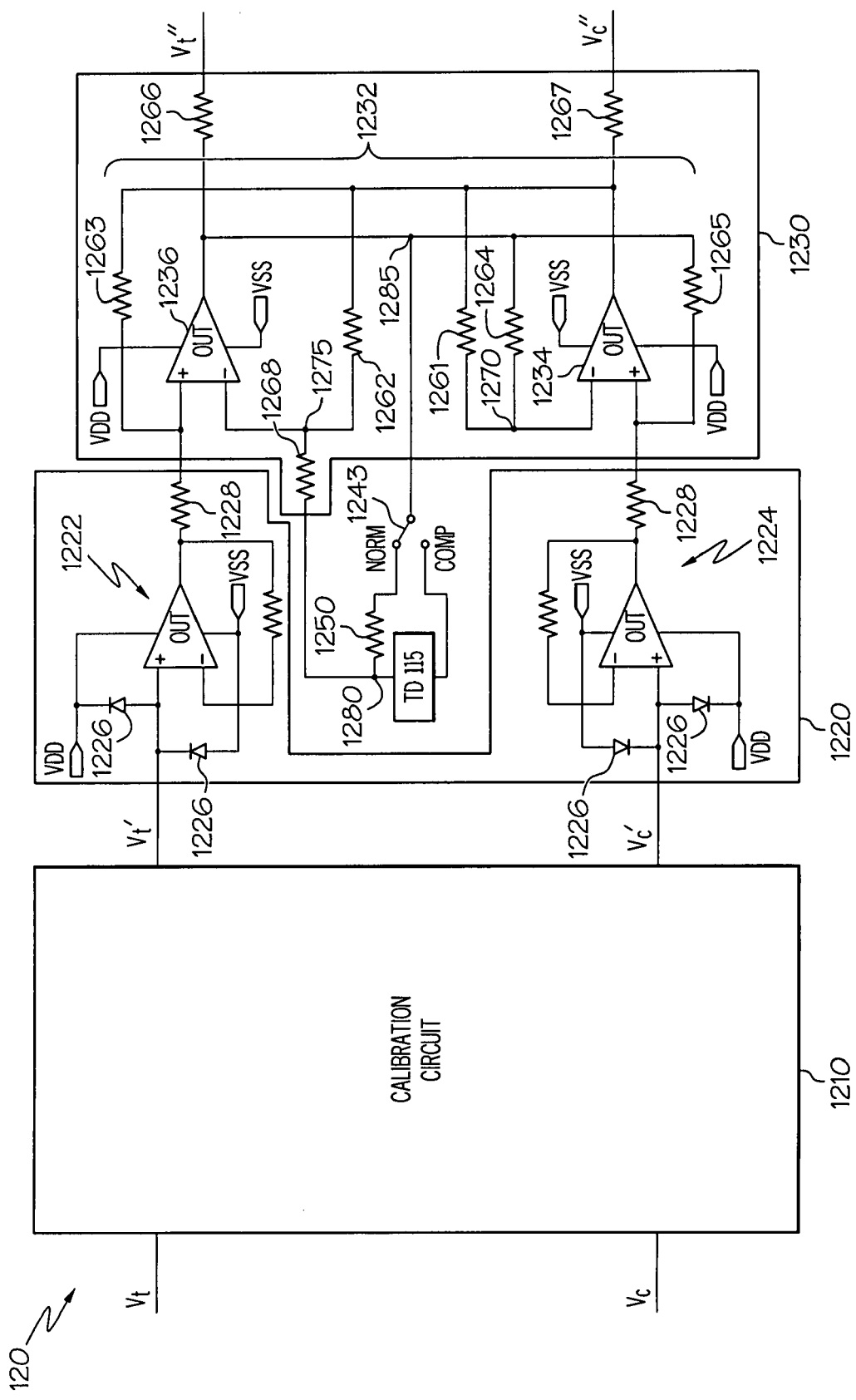
FIG. 2 is a schematic of an exemplary embodiment of a junction box for temperature compensating a torque sensor included in the system of FIG. 1.

Junction box 120 comprises a calibration circuit 1210, an isolation circuit 1220, and a temperature compensation circuit 1230. Calibration circuit 1210 may be any hardware, circuitry, and/or device capable of converting AC voltage to DC voltage and adjusting the DC voltage so that system 100 produces a calibrated torque output. With reference now to FIG. 2, calibration circuit 1210 is coupled to and is configured to receive AC tensile voltage $V_t$ and AC compression voltage $V_c$ from torque sensor 110. Calibration circuit 1210 is also configured to convert AC tensile voltage $V_t$ and AC compression voltage $V_c$ to DC tensile voltage ($V_t'$) and DC compression voltage ($V_c'$), respectively, as is known in the art. Furthermore, calibration circuit 1210 is coupled to and configured to provide DC tensile voltage $V_t'$ and DC compression voltage $V_c'$ to isolation circuit 1220.

Isolation circuit 1220 is configured to isolate calibration circuit 1210 from temperature compensation circuit 1230. That is, isolation circuit 1220 is configured to create high input impedance and low output impedance between calibration circuit 1210 and temperature compensation circuit 1230. In one embodiment, isolation circuit 1220 comprises a non-inverted unity gain circuit 1222 configured to receive DC tensile voltage $V_t'$ and a non-inverted unity gain circuit 1224 configured to receive DC compression voltage $V_c'$ from calibration circuit 1210. Isolation circuit 1220 may also include one or more diodes 1226 to protect unity gain circuit 1222 and/or 1224, and a resistor 1228 coupled to the output of unity gain circuit 1222 and/or 1224.

Temperature compensation circuit 1230 may be any hardware, circuitry, and/or device configured to increase and/or decrease the magnitude of DC tensile voltage $V_t'$ and/or the magnitude of DC compression voltage $V_c'$ to generate a temperature compensated tensile voltage ($V_t''$) and/or a temperature compensated compression voltage ($V_c''$). Furthermore, temperature compensation circuit is coupled to temperature detector 115 and configured to receive a signal from temperature detector 115 representing the temperature of shaft 105. During operation, the magnitude of DC tensile voltage $V_t'$ and/or the magnitude of DC compression voltage $V_c'$ is increased/decreased based on the sensed temperature of shaft 105 received from temperature detector 115 (discussed below). In one embodiment, in response to an increase in shaft temperature, temperature compensation circuit 1230 is configured to increase the magnitude of DC tensile voltage $V_t'$ when generating temperature compensated tensile voltage $V_t''$ and to decrease the magnitude of DC compression voltage $V_c'$ when generating temperature compensated compression voltage $V_c''$. Specifically, the DC tensile voltage $V_t'$ is increased by substantially the same magnitude or amount as the DC compression voltage $V_c'$ is decreased when generating the temperature compensated tensile voltage $V_t''$ and the temperature compensated compression voltage $V_c''$, respectively.

The effect of temperature on the magnetic permeability of the material used to construct torque sensor 110 determines the amount the DC tensile voltage $V_t'$ is increased and the amount the DC compression voltage $V_c'$ is decreased. Accordingly, torque sensor 110 may require different amounts of compensation based on the material used to construct torque sensor 110. Furthermore, some materials used to construct torque sensor 110 may not require temperature compensation at all or may require temperature compensation to occur only when shaft 105 temperature exceeds a threshold temperature.

In one embodiment, and with continued reference to FIG. 2, temperature compensation circuit 1230 comprises a fully differential amplifier 1232 coupled to unity gain circuits 1222 and 1224. Specifically, fully differential amplifier 1232 comprises a non-inverted operational amplifier (OP AMP) 1234 having a non-inverted input coupled to the output of unity gain circuit 1224 and a non-inverted OP AMP 1236 having a non-inverted input coupled to the output of unity gain circuit 1222. The output of OP AMP 1234 is coupled to its own inverted input and to the non-inverted and inverted inputs of OP AMP 1236. The output OP AMP 1236 is coupled to the non-inverted and inverted inputs of OP AMP 1234 and to a switch 1243 via a node 1285. Switch 1243 is configured to switch between a resistor 1250 (which is coupled to a node 1280) when system 100 is operating in a "normal" or uncompensated mode (discussed below) and temperature detector 115 (which is also coupled to node 1280) when system 100 is operating in a "temperature compensation" mode (also discussed below).

Fully differential amplifier 1232 also comprises a plurality of resistors 1261-1268. Specifically, resistor 1261 is coupled to the output of OP AMP 1234 and to a node 1270 coupled to the inverted input of OP AMP 1234, resistor 1262 is coupled to the output of OP AMP 1234 and to a node 1275 coupled to the inverted input of OP AMP 1236, resistor 1263 is coupled to the output of OP AMP 1234 and to the non-inverted input of OP AMP 1236, resistor 1264 is coupled to the output of OP AMP 1236 and to node 1270, resistor 1265 is coupled to the non-inverted input of OP AMP 1234, resistor 1266 is coupled between the output of OP AMP 1236 and RDPS 125, resistor 1267 is coupled between the output of OP AMP 1234 and RDPS 125, and resistor 1268 is coupled to node 1275 and node 1280.

As discussed above, temperature compensation circuit 1230 is configured to operate in a normal mode or a temperature compensation mode. In one embodiment, if the temperature of shaft 105 is below a threshold temperature (which varies with the material used to construct torque sensor 110), switch 1243 is configured to couple resistor 1250 to temperature compensation circuit 1230. As a result, the DC tensile voltage $V_t'$ and/or the DC compression voltage $V_c'$ are not altered. If the temperature of shaft 105 is greater than the threshold temperature, switch 1243 is configured to couple temperature detector 115 to temperature compensation circuit 1230. As a result, the DC tensile voltage $V_t'$ and/or the DC compression voltage $V_c'$ may be compensated. In an alternate embodiment, switch 1243 may be manually switched between the normal mode and the temperature compensation mode. In yet another embodiment, switch 1243 and resistor 1250 are both omitted and temperature detector 115 is coupled to node 1285 so that temperature compensation substantially always occurs.

With reference again to FIG. 1, junction box 120 is coupled to RDPS 125. In one embodiment, RDPS 125 is a digital processor configured to receive compensated tensile voltage $V_t''$ and compensated compression voltage $V_c''$ and calculate the amount of torque being applied to shaft 105 based on compensated tensile voltage $V_t''$ and compensated compression voltage $V_c''$. In one embodiment, RDPS 125 is configured to divide the difference of the compensated tensile voltage $V_t''$ and the compensated compression voltage $V_c''$ by the sum of the compensated tensile voltage $V_t''$ and the compensated compression voltage $V_t''$. This calculation can be represented by the following equation: $(V_t''-V_c'')/(V_t''+V_c'')$. Accordingly, since in various embodiments the DC tensile voltage $V_t'$ is increased by substantially the same magnitude or amount as the DC compression voltage $V_c'$ when generating the compensated tensile voltage $V_t''$ and the compensated compression voltage $V_c''$, respectively, the denominator $(V_t''+V_c'')$ remains substantially constant.

System 100 also includes a display 130 coupled to RDPS 125. Display 130 is configured to receive a signal from RDPS 125 indicating the amount of torque being applied to shaft 105 and display the amount of torque being applied to shaft 105 to, for example, a user.

Figure 3:
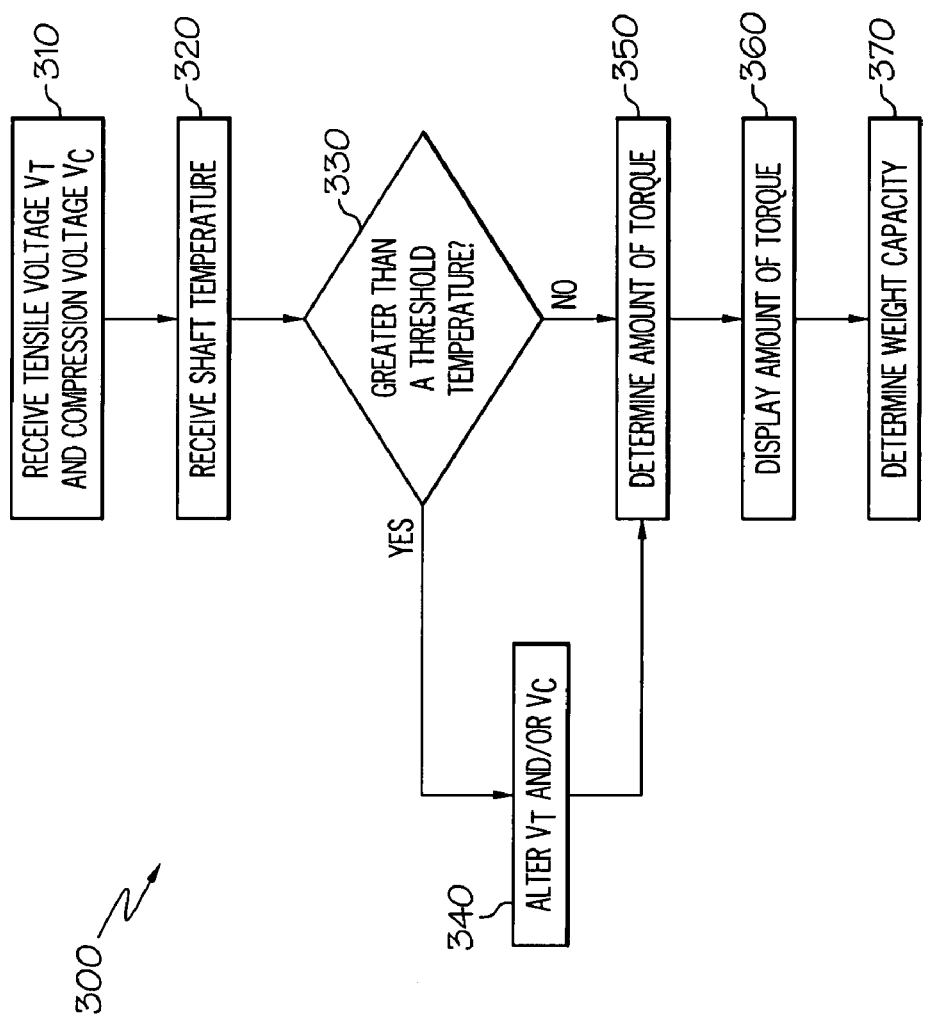
FIG. 3 is a flow diagram of one exemplary embodiment of a method for temperature compensating a torque sensor.

FIG. 3 is a flow diagram of one exemplary embodiment of a method 300 for temperature compensating a torque sensor (e.g., torque sensor 110) in communication with a shaft (e.g., shaft 105) coupled to an engine. Method 300 begins by receiving a tensile voltage ($V_t$) and a compression voltage ($V_c$) from torque sensor 110 (step 310). Method 300 also includes receiving the temperature of shaft 105 from a temperature detector (e.g., temperature detector 115) (step 320).

The temperature of shaft 105 is compared to a threshold temperature to determine whether the shaft temperature is greater than the threshold temperature (step 330). If the shaft temperature is greater than the threshold temperature, method 300 proceeds to step 350. On the other hand, if the shaft temperature is greater than the threshold temperature, the tensile voltage $V_t$ and/or the compression voltage $V_c$ are altered (step 340).

In one embodiment, altering comprises increasing the tensile voltage $V_t$, whereas in another embodiment, altering comprises decreasing the compression voltage $V_c$. In another embodiment, altering comprises increasing the tensile voltage $V_t$ and decreasing the compression voltage $V_c$, wherein the tensile voltage $V_t$ is increased by substantially the same amount as the compression voltage $V_c$ is decreased. In each of the various embodiments, the tensile voltage $V_t$ is increased and/or the compression voltage $V_c$ is decreased as the shaft temperature increases.

Method 300 also comprises determining the amount of torque being applied to the shaft based on the tensile voltage $V_t$ and the compression voltage $V_c$ (step 350). In one embodiment, determining the amount of torque comprises dividing a difference of the tensile voltage $V_t$ and the compression voltage $V_c$ by a sum of the tensile voltage and the compression voltage, as represented by the equation: $(V_t-V_c)/(V_t+V_c)$. In this equation, $V_t$ and/or $V_c$ may have been altered in step 340, or both remain unaltered via step 330.

The amount of torque may then be displayed on a display (e.g., display 130) (step 360). The amount of torque may then be used to determine, for example, how much weight an aircraft (e.g., a helicopter) is capable of lifting at that particular moment (step 370).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. An apparatus for temperature compensating a torque sensor configured to output a tensile voltage and a compression voltage representative of a tensile stress and a compression stress, respectively, due to a torque being applied to a shaft, comprising:
   a temperature detector in thermal communication with the shaft; and
   a temperature compensation circuit coupled to the temperature detector and configured to be coupled to the sensor, wherein:
      the temperature compensation circuit comprises a fully differential amplifier configured to alter the tensile voltage and the compression voltage, and
      the temperature compensation circuit is further configured to receive a signal from the temperature detector representing a shaft temperature and to alter the tensile voltage and the compression voltage based on the shaft temperature.

2. The apparatus of claim 1, wherein the fully differential amplifier comprises:
   a first non-inverted operational amplifier (OP AMP) configured to increase the tensile voltage; and
   a second non-inverted OP AMP coupled to the first non-inverted OP AMP, the second non-inverted OP AMP configured to decrease the compression voltage.

3. The apparatus of claim 1, further comprising an isolation circuit including an input configured to be coupled to the sensor and an output coupled to the temperature compensation circuit, the isolation circuit configured to provide high input impedance and low output impedance.

4. The apparatus of claim 3, wherein the isolation circuit comprises:
   a first non-inverted unity gain circuit coupled to the fully differential amplifier and configured to be coupled to the sensor; and
   a second non-inverted unity gain circuit coupled to the fully differential amplifier and configured to be coupled to the sensor.

5. The apparatus of claim 1, wherein the temperature detector comprises a resistive temperature detector or a thermistor.

6. The apparatus of claim 1, wherein the temperature compensation circuit forms at least a portion of a junction box.

7. A system for measuring an amount of torque being applied to a shaft, comprising:
   a sensor coupled to the shaft, the sensor configured to generate a tensile voltage and a compression voltage representative of a tensile stress and a compression stress, respectively, due to a torque applied to the shaft;
   a temperature detector in thermal communication with the shaft, the temperature detector configured to detect a shaft temperature; and
   a junction box comprising a temperature compensation circuit coupled to the sensor and the temperature detector, the temperature compensation circuit comprising a fully differential amplifier configured to alter the tensile voltage and the compression voltage based on the shaft temperature.

8. The system of claim 7, wherein the fully differential amplifier comprises:
   a first non-inverted operational amplifier (OP AMP) configured to increase the tensile voltage; and
   a second non-inverted OP AMP coupled to the first non-inverted OP AMP, the second non-inverted OP AMP configured to decrease the compression voltage.

9. The system of claim 7, wherein the junction box further comprises:
   a calibration circuit coupled to the sensor, the calibration circuit configured to:
      calibrate the tensile voltage, and
      calibrate the compression voltage; and
   an isolation circuit including an input coupled to the calibration circuit and an output coupled to the temperature compensation circuit, the isolation circuit configured to create high input impedance and low output impedance.

10. The system of claim 9, wherein the isolation circuit comprises:
   a first non-inverted unity gain circuit coupled to the calibration circuit and the temperature compensation circuit, the first non-inverted unity gain circuit configured to receive the calibrated tensile voltage; and
   a second non-inverted unity gain circuit coupled to the calibration circuit and the temperature compensation circuit, the second non-inverted unity gain circuit configured to receive the calibrated compression voltage.

11. The system of claim 9, wherein the temperature compensation circuit is configured to increase the calibrated tensile voltage and decrease the calibrated compression voltage by an amount substantially equal to the increase in the calibrated tensile voltage.

12. The system of claim 9, further comprising:
   a detector power supply coupled to the temperature compensation circuit and configured to calculate the amount of torque applied to the shaft based on the altered tensile voltage and the altered compression voltage; and
   a display coupled to the detector power supply, the display configured to display the calculated amount of torque applied to the shaft.

13. A method for temperature compensating a sensor configured to output a tensile voltage and a compression voltage representative of a tensile stress and a compression stress, respectively, due to a torque being applied to a shaft, the method comprising the steps of:
   receiving the tensile voltage and the compression voltage;
   altering the tensile voltage and the compression voltage based on a temperature of the shaft; and
   determining the amount of torque being applied to the shaft based on the altered tensile voltage and the altered compression voltage, wherein the altering step comprises the steps of:
      increasing the tensile voltage as a function of an increase in the temperature of the shaft, and
      decreasing the compression voltage as a function of an increase in the temperature of the shaft.

14. The method of claim 13, wherein the determining step further comprises the step of dividing a difference of the altered tensile voltage ($V_t$) and the altered compression voltage ($V_c$) by a sum of the altered tensile voltage and the altered compression voltage, as represented by the equation: $(V_t-V_c)/(V_t+V_c)$.

15. The method of claim 13, wherein the decreasing step comprises the step of decreasing the compression voltage by an amount substantially equally to the increase in the tensile voltage.

16. The method of claim 15, wherein the determining step further comprises the step of dividing a difference of the increased tensile voltage ($V_t$) and the decreased compression voltage ($V_c$) by a sum of the increased tensile voltage and the increased compression voltage, as represented by the equation: $(V_t-V_c)/(V_t+V_c)$.

* * * * *